(12) United States Patent
Palanigounder et al.

(10) Patent No.: US 9,338,653 B2
(45) Date of Patent: May 10, 2016

(54) SECURE RECEPTION REPORTING

(71) Applicant: QUALCOMM Incorporated, San Diego, CA (US)

(72) Inventors: Anand Palanigounder, San Diego, CA (US); Jun Wang, Poway, CA (US); Xiaoxia Zhang, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/557,273

(22) Filed: Dec. 1, 2014

(65) Prior Publication Data

US 2015/0133088 A1 May 14, 2015

Related U.S. Application Data

(62) Division of application No. 13/791,879, filed on Mar. 8, 2013, now Pat. No. 9,078,130.

(60) Provisional application No. 61/622,434, filed on Apr. 10, 2012.

(51) Int. Cl.
*H04M 1/66* (2006.01)
*H04W 12/06* (2009.01)
(Continued)

(52) U.S. Cl.
CPC ............ *H04W 12/06* (2013.01); *H04L 12/1868* (2013.01); *H04L 63/0823* (2013.01); *H04W 4/06* (2013.01); *H04W 12/04* (2013.01); *H04L 9/3242* (2013.01); *H04L 63/168* (2013.01)

(58) Field of Classification Search
USPC .............................. 455/411, 410, 435.1, 412.2
See application file for complete search history.

(56) References Cited

U.S. PATENT DOCUMENTS 7,058,619 B2  6/2006  Wanish
7,240,194 B2  7/2007  Hallin et al.
(Continued)

FOREIGN PATENT DOCUMENTS

JP   2009512320 A   3/2009

OTHER PUBLICATIONS

"3rd Generation Partnership Project; Technical Specification Group Services and System Aspects; 3G Security; Security of Multimedia Broadcast/Multicast Service (MBMS) (Release 10)", 3GPP Standard; 3GPP TS 33.246, 3rd Generation Partnership Project (3GPP), Mobile Competence Centre; 650, Route Des Lucioles; F-06921 Sophiaantipolis Cedex ; France, No. V10.0.0, Dec. 28, 2010, pp. 1-68, XP050462453.

(Continued)

Primary Examiner — David Q Nguyen
(74) Attorney, Agent, or Firm — Arent Fox LLP

(57) ABSTRACT

In a first configuration, a UE receives, from a service provider, a certificate authority list. The certificate authority list is at least one of integrity protected or encrypted based on a credential known by the UE and the service provider and stored on a smartcard in the UE. The UE authenticates a server using the received certificate authority list. In a second configuration, the UE receives a user service discovery/announcement including a reception report configuration and an address of a server. The UE sends a protected reception report to the server based on the reception report configuration. In a third configuration, the UE receives a protected broadcast announcement and communicates based on the broadcast announcement. The broadcast announcement is at least one of integrity protected or encrypted based on a credential known by the UE and stored on a smartcard in the UE.

30 Claims, 15 Drawing Sheets

(51) Int. Cl.
*H04L 12/18* (2006.01)
*H04L 29/06* (2006.01)
*H04W 4/06* (2009.01)
*H04W 12/04* (2009.01)
*H04L 9/32* (2006.01)

(56) References Cited

U.S. PATENT DOCUMENTS

| | | |
|---|---|---|
| 8,312,263 B2 | 11/2012 | Bell et al. |
| 8,347,403 B2 | 1/2013 | Rubio |
| 8,364,964 B2 | 1/2013 | Medvinsky et al. |
| 8,457,318 B2 | 6/2013 | Guenther |
| 2011/0055867 A1 | 3/2011 | Lee et al. |
| 2012/0102315 A1 | 4/2012 | Holtmanns et al. |
| 2012/0240167 A1 | 9/2012 | Vasudevan et al. |
| 2013/0095789 A1 | 4/2013 | Keevill et al. |
| 2013/0247118 A1 | 9/2013 | Oyman |
| 2013/0267202 A1 | 10/2013 | Palanigounder et al. |
| 2015/0087271 A1 | 3/2015 | Palanigounder et al. |

OTHER PUBLICATIONS

"3rd Generation Partnership Project; Technical Specification Group Services and System Aspects; Generic Authentication Architecture (GAA); Support for subscriber certificates (Release 10)", 3GPP Standard; 3GPP TS 33.221, 3rd Generation Partnership Project (3GPP), Mobile Competence Centre; 650, Route Des Lucioles ; F-06921 Sophiaantipolis Cedex; France, No. V10.0.0, Apr. 4, 2011, pp. 1-25, XP050476974.

"3rd Generation Partnership Project; Technical Specification Group Services and System Aspects; Multimedia Broadcast/Multicast Service (MBMS); Protocols and codecs (Release 1 0)", 3GPP Standard; 3GPP TS 26.346, 3rd Generation Partnership Project (3GPP), Mobile Competence Centre; 650, Route Des Lucioles ; F-06921 Sophiaantipolis Cedex; France, vol. SA WG4, No. V10.3.0, Mar. 9, 2012, pp. 1-162, XP050580070.

International Search Report and Written Opinion—PCT/US2013/030277—ISA/EPO—Jun. 10, 2013.

Qualcomm Incorporated: "Confidentiality Protection for MBMS Associated Delivery Procedures", 3GPP Draft; S3-120728, 3rd Generation Partnership Project (3GPP), Mobile Competence Centre; 650, Route Des Lucioles; F-06921 Sophia-Antipolis Cedex; France, vol. SA WG3, No. Bratislava; 20120709-20120713, Jul. 2, 2012, XP050636888.

Qualcomm Incorporated: "Secure Reception Report and File Repair", 3GPP Draft; S4-120830 Discussion Paper on Secure Reception Report and File Repair, 3rd Generation Partnership Project (3GPP), Mobile Competence Centre ; 650, Route Des Lucioles; F-06921 Sophia-Antipolis Cedex; France, vol. SA WG4, No. Erlangen, Germany; 20120521-20120525, May 24, 2012, XP050639507.

Qualcomm Incorporated: "Fixing the lack of confidentiality protection for Associated Delivery Procedures", 3GPP Draft; S3-120730, 3rd Generation Partnership Project (3GPP), Mobile Competence Centre; 650, Route Des Lucioles; F-06921 Sophia-Antipolis Cedex, France, vol. SA WG3, No. Bratislava; 20120709-20120713, Jul. 2, 2012, XP050636890.

European Search Report—EP15162835—Search Authority—The Hague—Jul. 17, 2015.

European Search Report—EP15162840—Search Authority—The Hague—Jul. 22, 2015.

Translation of First Office Action issued for Japanese Application No. 2015-505724 dated Dec. 1, 2015, 2 pages.

SECURE RECEPTION REPORTING

CROSS-REFERENCE TO RELATED APPLICATION(S)

This application is a divisional of U.S. patent application Ser. No. 13/791,879, entitled "Secure Reception Reporting" and filed on Mar. 8, 2013, which claims the benefit of U.S. Provisional Application Ser. No. 61/622,434, entitled "Secure Reception Reporting" and filed on Apr. 10, 2012, both of which are expressly incorporated by reference herein in its entirety.

BACKGROUND

1. Field

The present disclosure relates generally to communication systems, and more particularly, to secure reception reporting.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus UE are provided. The UE receives, from a service provider, a certificate authority list. The certificate authority list is at least one of integrity protected or encrypted based on a credential known by the UE and the service provider and stored on a smartcard in the UE. In addition, the UE authenticates a server using the received certificate authority list.

In an aspect of the disclosure, a method, a computer program product, and an apparatus are provided. The apparatus receives a user service discovery/announcement including a reception report configuration and an address of a server. In addition, the apparatus sends a protected reception report to the server based on the reception report configuration.

In an aspect of the disclosure, a method, a computer program product, and an apparatus are provided. The apparatus may be a UE. The UE receives a protected broadcast announcement. The broadcast announcement is at least one of integrity protected or encrypted based on a credential known by the UE and stored on a smartcard in the UE. In addition, the UE communicates based on the broadcast announcement.

DETAILED DESCRIPTION

Figure 1:
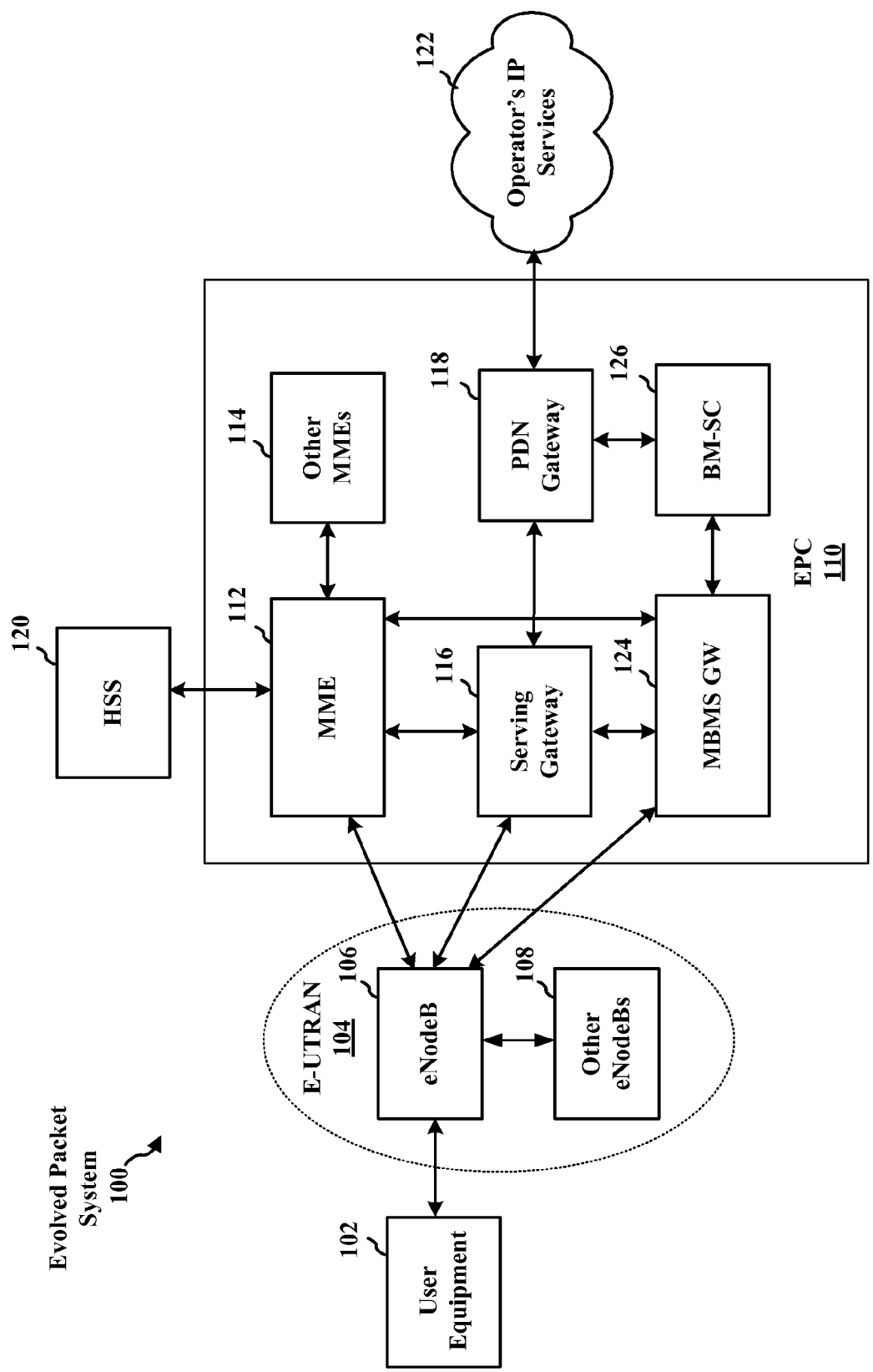
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
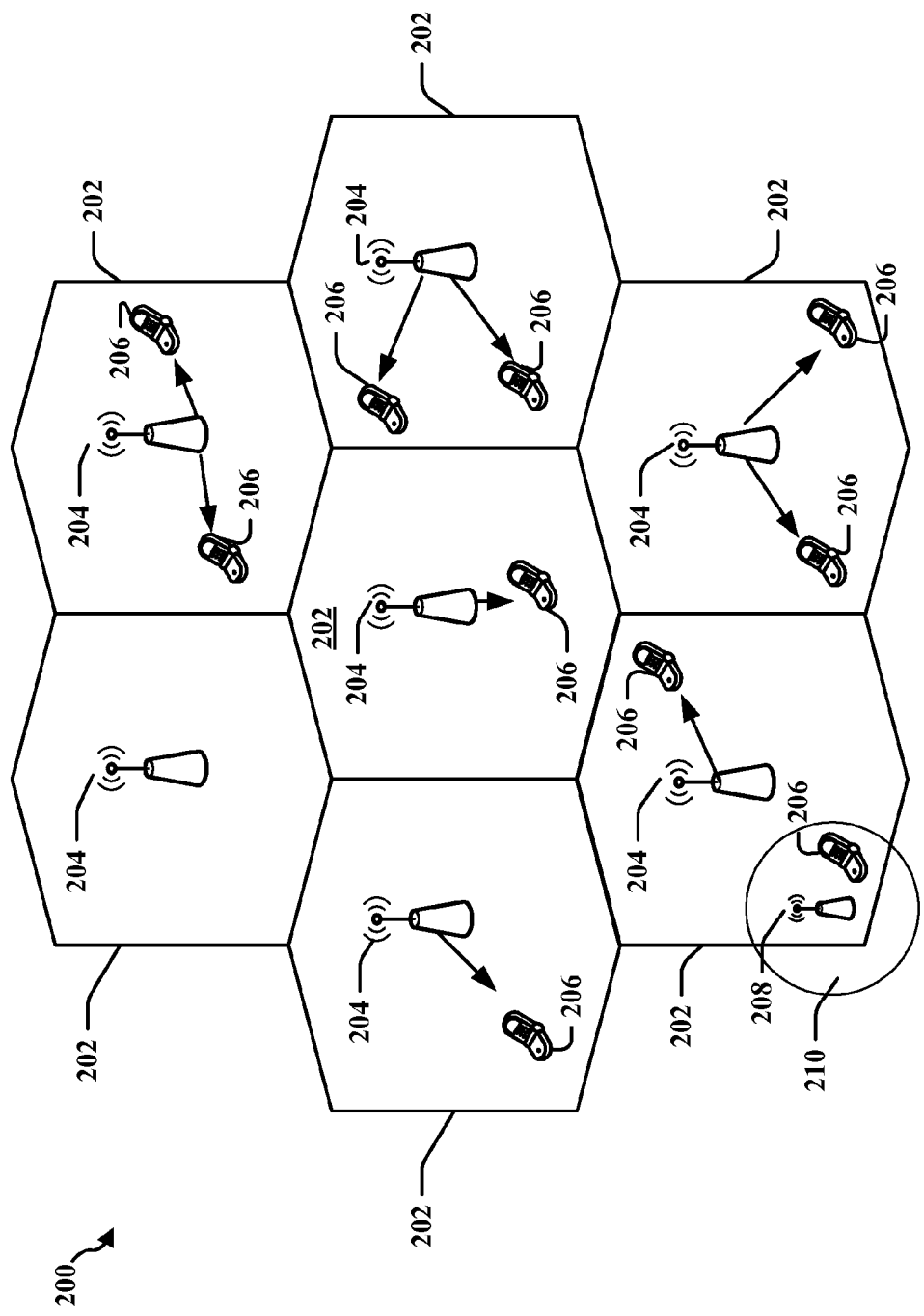
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
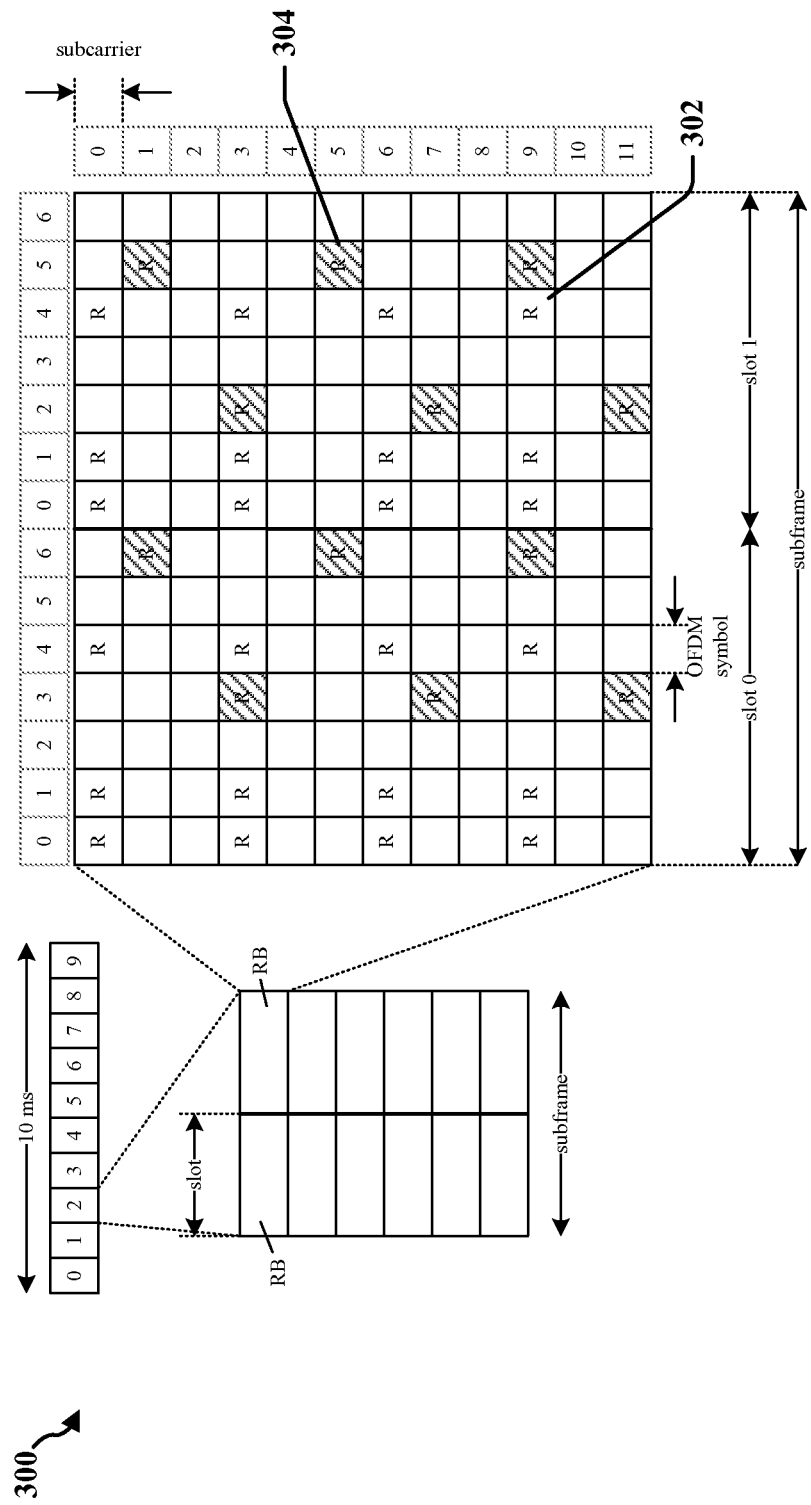
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
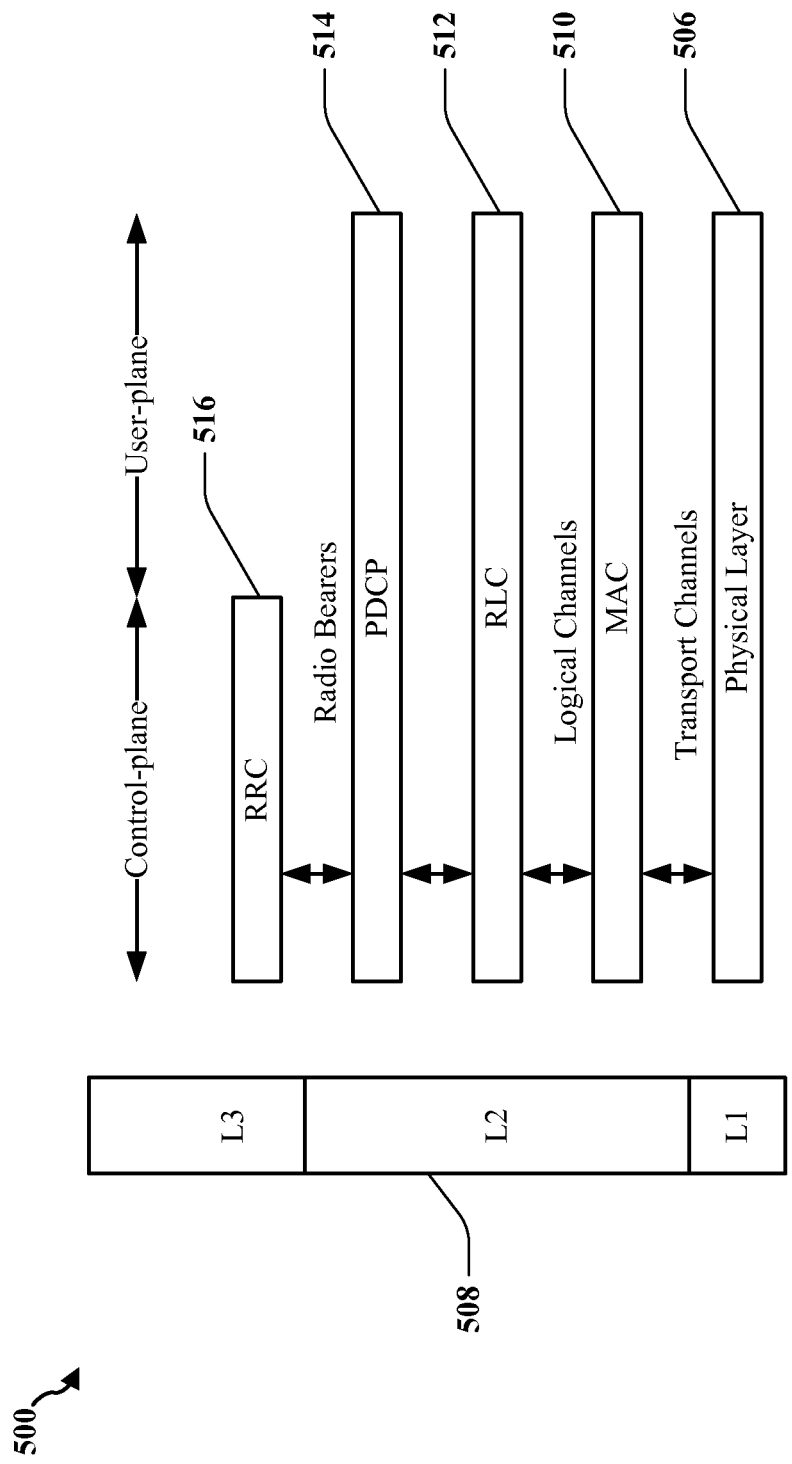
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP)

514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
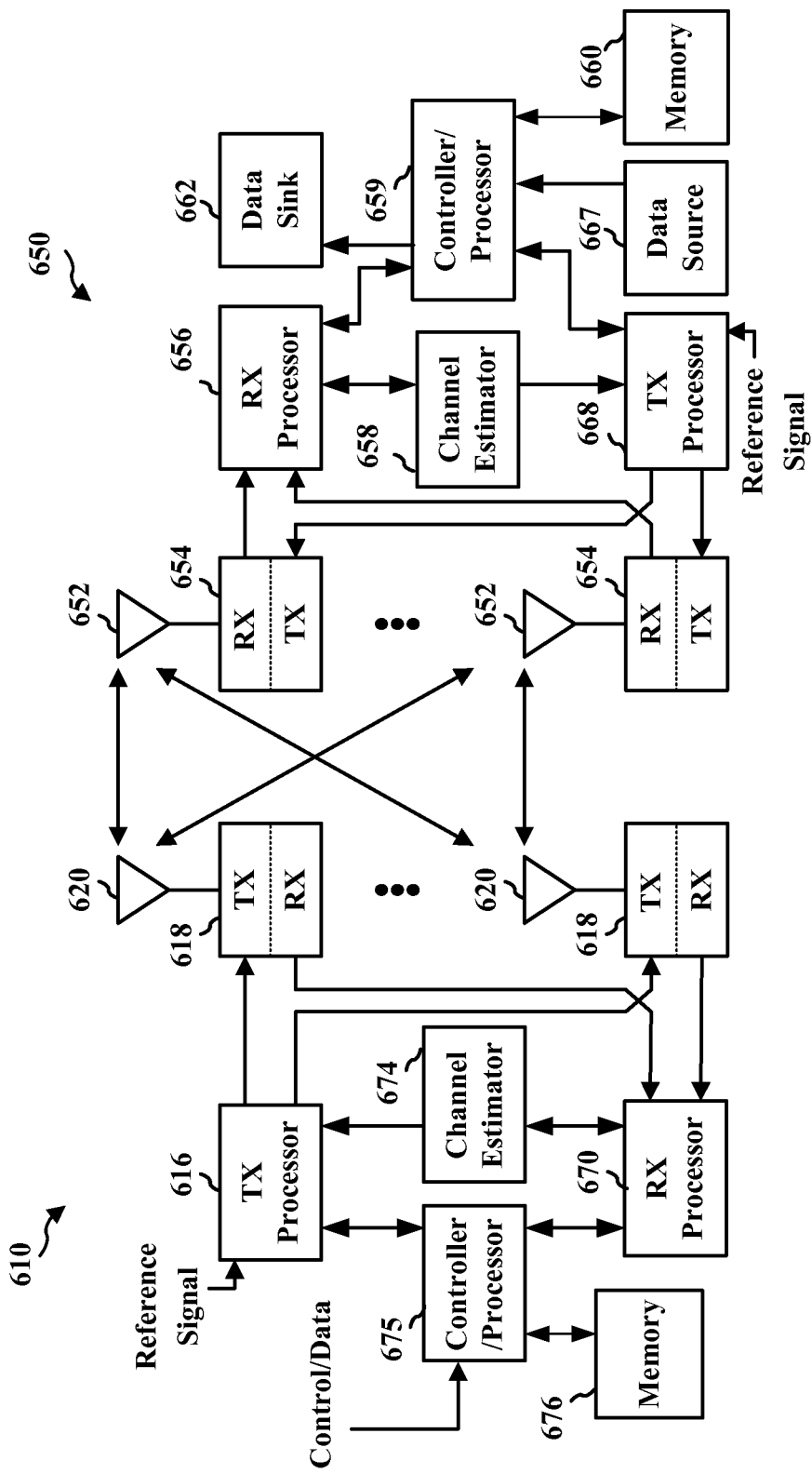
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
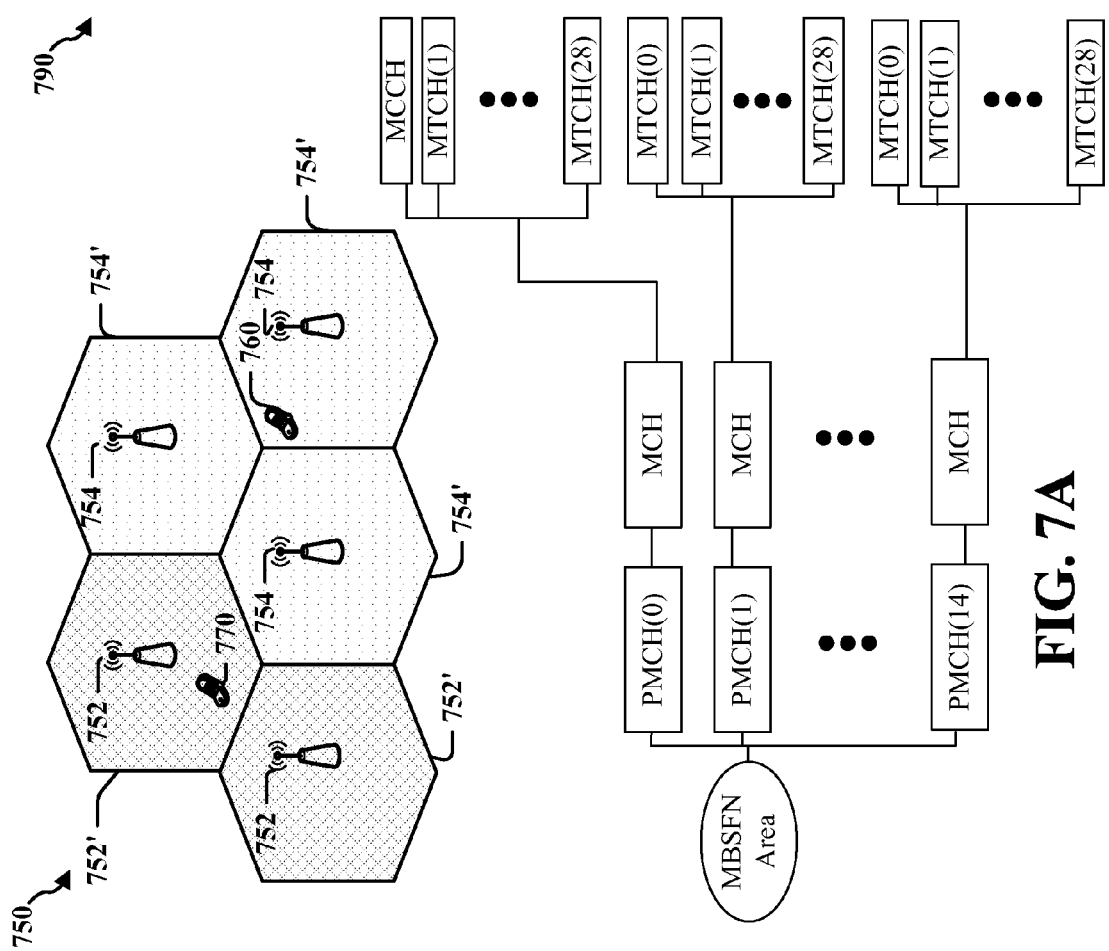
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

A UE (i.e., MBMS receiver) may receive an MBMS user service discovery/announcement. The user service discovery/announcement includes service description information and a reception report configuration. The reception report configuration may include one or more server uniform resource locators (URLs) to which the UE may send an MBMS reception report. For MBMS download delivery, a reception report is used to report the complete reception of one or more files and/or to report statistics on the download delivery. For MBMS streaming delivery, a reception report is used to report statistics on the streaming delivery. The UE includes information in the reception report based on a reporting type. The reporting types include reception acknowledgement (RAck), statistical reporting for successful reception (StaR), statistical reporting for all content reception (StaR-all), and statistical reporting without reception acknowledgement (StaR-only). When the UE identifies a complete reception of a content item or the completion of a session, the UE determines whether a reception report is required. The UE may determine whether to send a reception report based on a received sample percentage attribute in the reception report configuration. The UE selects a time at which to send a reception report request including the reception report and selects a server from a list to which to send the reception report request. The UE selects the time and the server randomly and uniformly distributed. The UE then sends the reception report request to the server through a hypertext transfer protocol (HTTP) post operation. The UE subsequently receives a reception report response from the server through an HTTP response operation.

Currently, the reception report and the user service discovery/announcement are not protected. The reception report may contain sensitive information related to a user or a network. For example, the reception report may include information identifying content that a UE is receiving and a location in which the UE is receiving the content. For another example, the reception report may include network topology information (e.g., cell ID, etc.) and radio link information (e.g., MBSFN reference signal received power (RSRP), reference signal received quality (RSRQ), and/or signal to interference plus noise ratio (SINR) information). Further, the user service discovery/announcement may include sensitive data fields and/or may be subject to tampering through having a UE receive a fraudulent user service discovery/announcement that causes the UE to send reception reports to a rogue server (e.g., a server unassociated with the service provider). Methods, computer program products, an apparatuses are provided infra for providing secure reception reporting and secure reception of the user service discovery/announcement.

Figure 8:
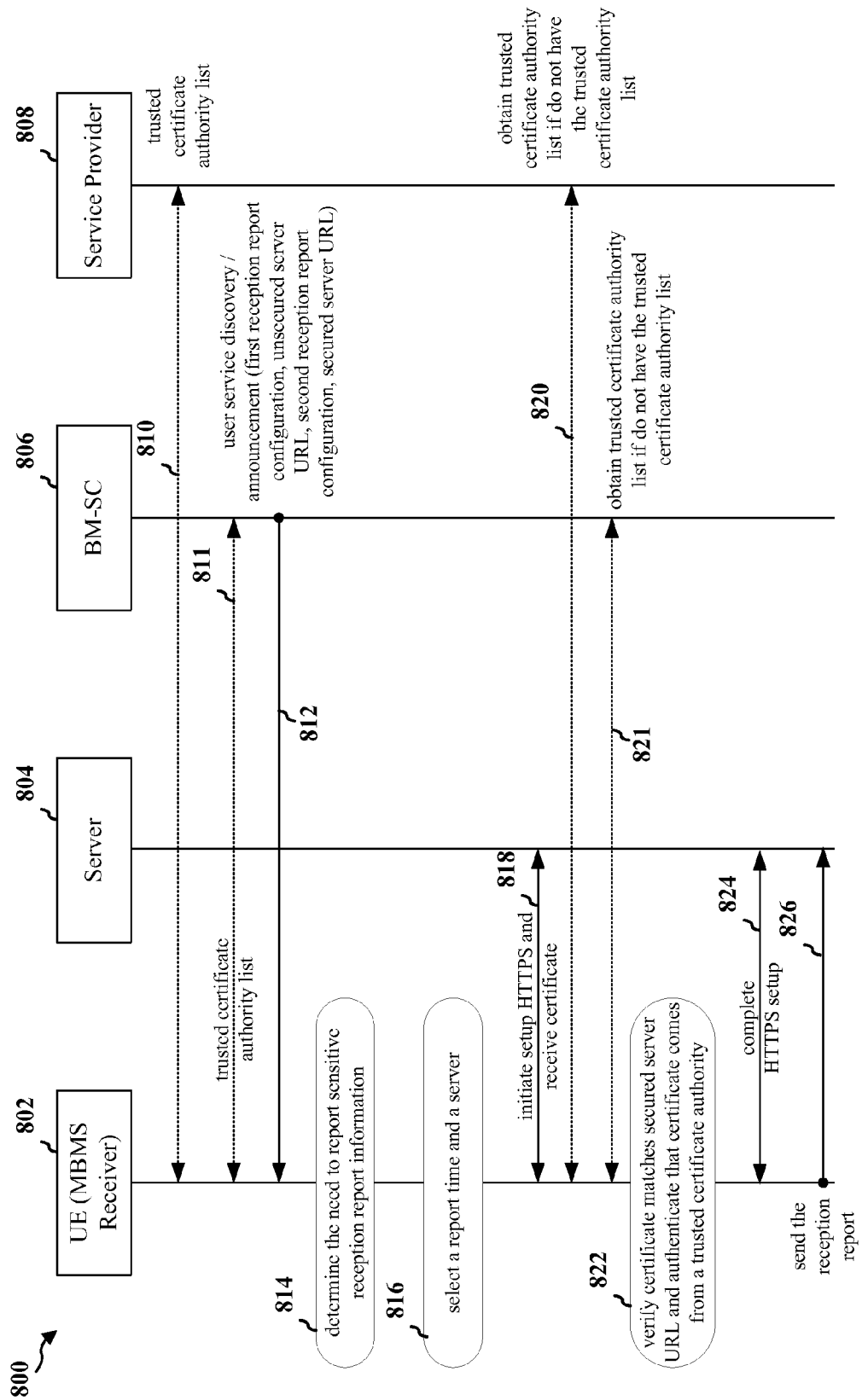
FIG. 8 is a diagram illustrating a first exemplary method for sending a secure reception report.

FIG. 8 is a diagram 800 illustrating a first exemplary method for sending a secure reception report. As shown in FIG. 8, in step 810, a UE 802 may receive a trusted certificate authority list from a service provider 808. In another configuration, step 810 is not performed, and in step 811, the UE 802 may receive the trusted certificate authority list from a broadcast multicast service center (BM-SC) 806. The trusted certificate authority list includes certificates of trusted certificate authorities. A trusted certificate authority is an authority from which the UE 802 may trust certificates for setting up a secure connection with a server that provided the certificate. The trusted certificate authority list may be encrypted and/or integrity protected based on a credential known by the UE 802 and the service provider 808/BM-SC 806. The credential may be stored on a smartcard in the UE 802. The credential may be a shared key that is known only to the UE 802 and the service provider 808/BM-SC 806. Examples of such a shared key include any key derived from a root key (e.g., Ki, which is a root key used for wireless access authentication) that is known to the service provider 808/BM-SC 806 and the UE 802 based on the UE subscription with the service provider (e.g., on the Universal Subscriber Identity Module (USIM) application on the Universal Integrated Circuit Card (UICC) smartcard). Examples of such a derived key include, but are not limited to, an MBMS User Key (MUK), an MBMS request key (MRK), a key derived from the MUK or the MRK, or any other key derived from the shared key. To integrity protect the trusted certificate authority list, the trusted certificate authority list may be hashed using the credential through a keyed hash function, such as a Hash-based Message Authentication code (HMAC) (which may be a function of a shared key such as the MUK or the MRK) to obtain a hash value (also known as hash code, hash sum, checkcode, or hash), and the hash value may be included with the trusted certificate authority list so that the UE 802 may check whether fields within the trusted certificate authority list have been modified since the integrity protection.

In step 812, the UE 802 may receive a user service discovery/announcement from a BM-SC 806. The user service discovery/announcement may include one or more reception report configurations and one or more addresses of servers to which the UE may send the reception report. In one example, the user service discovery/announcement includes a first reception report configuration and an unsecured server URL for sending unsecure reception reports, and a second reception report configuration and a secured server URL for sending secure reception reports. The unsecured server URL may be a URL for sending the reception report through HTTP. The secured server URL may be a URL for sending the reception report through HTTP secure (HTTPS) (e.g., HTTP with the transport layer security (TLS) protocol). The user service discovery/announcement may itself be integrity protected and/or encrypted based on a credential known by the UE 802 and the BM-SC 806. The credential may be stored on a smartcard in the UE 802. The credential may be a group shared key such as an MBMS service key (MSK) that is known to the set of UEs that are authorized to receive the user service discovery/announcement or a key derived from the MSK. Alternatively, the group shared key may be preconfigured on the UE (e.g., using any configuration mechanism such as over-the-air (OTA) configuration or Open Mobile Alliance Device Management (OMA-DM) configuration protocol).

In step 814, the UE 802 determines whether to send the reception report and whether sensitive reception report information may be included in the reception report. Step 814 may occur after the UE 802 identifies a complete reception of an MBMS content item or the completion of an MBMS session. In step 816, the UE 802 selects a report time and a server. If the UE 802 determines that sensitive reception report information will not be included in the reception report, the UE 802 may select to send the reception report through an unsecured connection to the unsecured server URL. If the UE 802 determines that sensitive reception report information will be included in the reception report, the UE 802 may select to send the reception report through a secured connection to the secured server URL.

Assuming the UE 802 selects to send the reception report through a secured connection to the server 804, in step 818, the UE 802 initiates setup of HTTPS. In step 818, the UE 802 receives a certificate of the server 804. The certificate may be an X.509 server certificate. If the UE 802 has not yet received the trusted certificate authority list (step 810 or step 811 has not occurred), in step 820, the UE 802 obtains the trusted certificate authority list from the service provider 808, or in step 821, the UE 802 obtains the trusted certificate authority list from the BM-SC 806. In step 822, the UE 802 verifies that the certificate belongs to the server identified by the secured server URL (e.g., by verifying that the subjectAltName in the X.509 server certificate is the same as the server address in the user service discovery/announcement) and authenticates the server using the certificate by checking whether the received certificate was issued based on a root certificate included in the trusted certificate authority list. The server authentication provides assurance to the UE 802 that the secure server address has not been tampered and the server to which the UE is connecting is authentic. In step 824, if the UE 802 is able to authenticate the server 804, the UE 802 determines to complete the setup of a secure connection with the server 804. The UE 802 then completes the setup of a secure connection through HTTPS with the server 804. In step 826, the UE 802 sends the reception report through the HTTPS connection based on the corresponding reception report configuration.

Step 818 is shown occurring after step 816. However, step 818 may occur before step 814. In steps 810, 820, the UE receives the trusted certificate authority list from the service provider 808. However, in steps 811, 821, the trusted certificate authority list may be received from the BM-SC as part of the UE eMBMS service registration procedures or through another unicast mechanism between the UE and the service provider. To obtain the trusted certificate authority list as part of the UE eMBMS service registration procedures, the UE may send an HTTP post message to the BM-SC 806. The message may include a registration indication, MBMS user service IDs, and a request for the certificate authority list. The BM-SC 806 may respond and send the certificate authority list. The BM-SC 806 may integrity protect and/or encrypt the certificate authority list based on the MRK, the MUK, or a key derived from one of the MRK or the MUK. In another configuration, the trusted certificate authority list may be pre-configured on the UE 802. For example, the pre-configuration may be part of the eMBMS OTA configuration or Device Management or may be done by original equipment manufacturers (OEMs) on behalf of the service provider 808.

Figure 9:
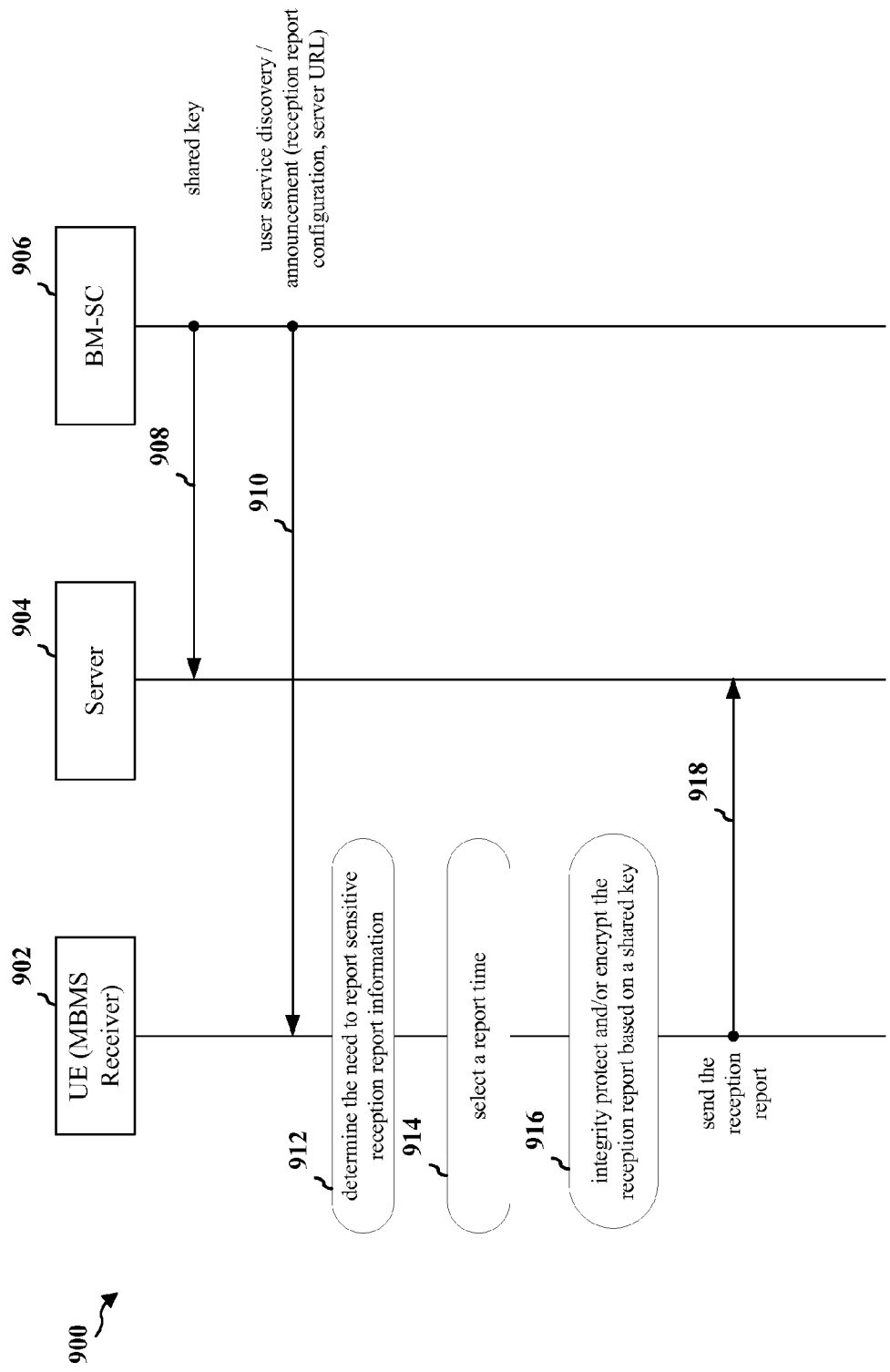
FIG. 9 is a diagram illustrating a second exemplary method for sending a secure reception report.

FIG. 9 is a diagram 900 illustrating a second exemplary method for sending a secure reception report. In step 908, the server 904 receives an MUK or an MRK or a key derived from the MUK or MRK from the BM-SC 906. In step 910, the UE 902 receives a user service discovery/announcement. The user service discovery/announcement may be integrity protected and/or encrypted based on an MSK or a similar group key. In step 912, the UE 902 determines whether to send a reception report and whether the reception report would include sensitive information. In step 914, the UE 902 selects a report time for sending the reception report. In step 916, the UE integrity protects and/or encrypts the reception report based on the MUK or the MRK or its derived key. In step 918, the UE sends the protected reception report to the server 904. It should be noted that the decision to protect the user service discovery/announcement is independent of the decision to protect the reception report.

The UE 902 may integrity protect the reception report by hashing the reception report or one or more fields in the reception report through a hash function to obtain a hash value. The hash function may itself be a function of the MUK or the MRK or its derived key. The UE 902 may send the hash value with the reception report to the server 904. Alternatively or in addition, the UE 902 may encrypt the reception report by encrypting the entire reception report or one or more fields in the reception report based on the MUK or the MRK (e.g., using the MUK or the MRK or a key derived from the MUK or the MRK).

Figure 10:
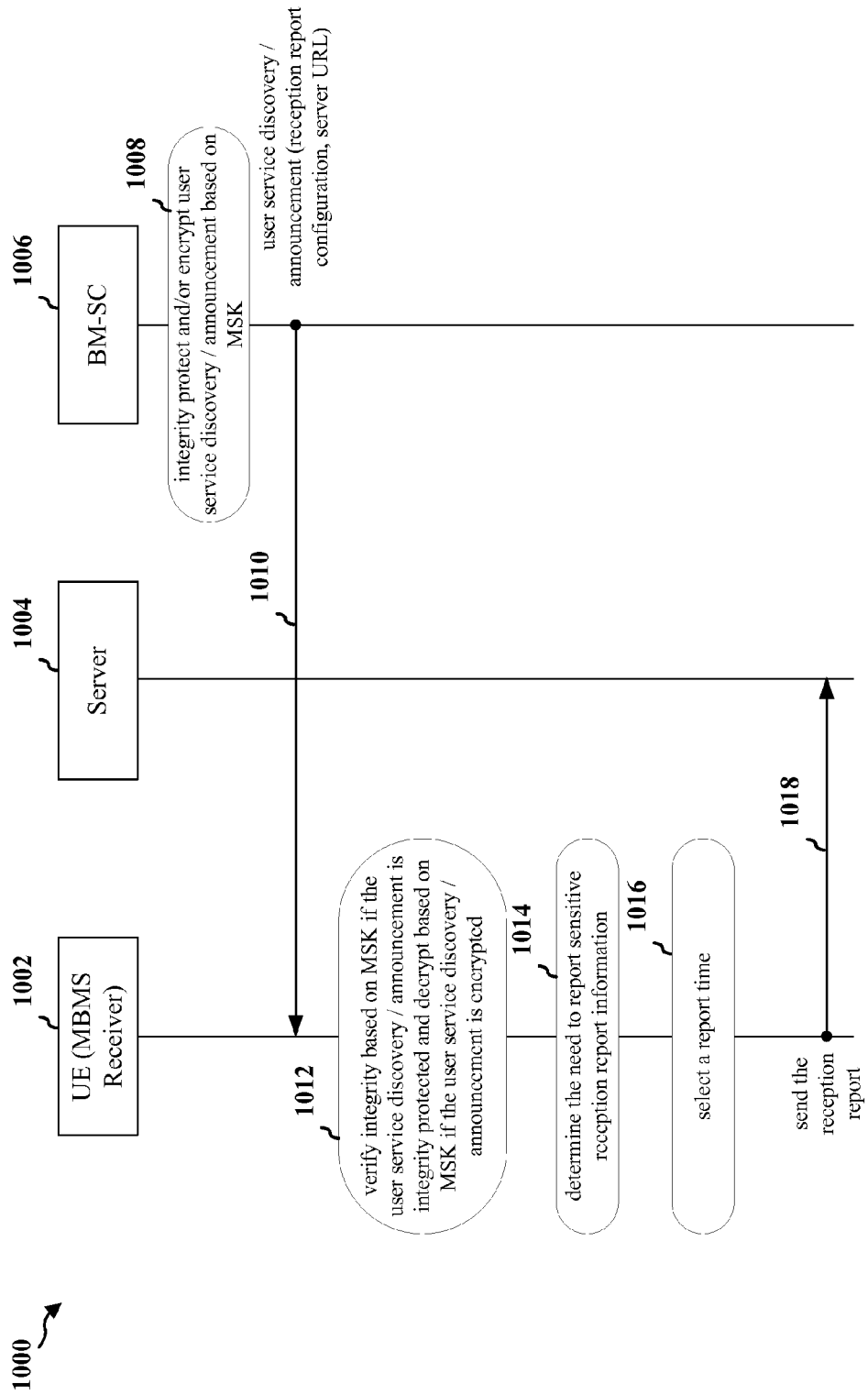
FIG. 10 is a diagram illustrating an exemplary method for receiving and processing a secure user service discovery/announcement.

FIG. 10 is a diagram 1000 illustrating an exemplary method for receiving and processing a secure user service discovery/announcement. In step 1008, the BM-SC 1006 integrity protects and/or encrypts a user service discovery/announcement. The BM-SC 1006 may integrity protect and/or encrypt the complete user service discovery/announcement or one or more fields of the user service discovery/announcement. For example, the BM-SC 1006 may integrity protect and/or encrypt just the reception report configuration within the user service discovery/announcement or just the server URL field. The BM-SC 1006 may integrity protect the user service discovery/announcement by hashing the user service discovery/announcement or one or more fields in the user service discovery/announcement through a hash function to obtain a hash value. The hash function may itself be a function of the MSK or a similar group key known to a group of UEs and the service provider. The BM-SC 1006 may send the hash value with the user service discovery/announcement to the UE 1002. Alternatively or in addition, the BM-SC 1006 may encrypt the user service discovery/announcement by encrypting the entire user service discovery/announcement or one or more fields in the user service discovery/announcement based on the MSK (e.g., using the MSK or a key derived from the MSK). If the BM-SC 1006 decides to protect only one or more fields in the user service discovery/announcement, the BM-SC 1006 may indicate the decision to the UE 1002 through the field type sent in the user service discovery/announcement. The field type may also be integrity protected. The UE may be pre-configured with the fields that will be protected through an OTA configuration or a device management procedure or the UE may be programmed in advance to know which fields are to be protected.

In step 1010, the BM-SC 1006 sends the user service discovery/announcement to the UE 1002. In step 1012, the UE 1002 verifies an integrity of the user service discovery/announcement based on the MSK if the user service discovery/announcement is integrity protected. In addition, the UE 1002 decrypts the user service discovery/announcement based on the MSK if the user service discovery/announcement is encrypted. In step 1014, the UE 1002 determines whether to send a reception report and whether the reception report may contain sensitive information. In step 1016, the UE 1002 selects a time for sending the reception report. In step 1018, the UE 1002 sends the reception report to the server 1004. In one configuration, the UE 1002 sends the reception report to the server 1004 through a secure connection (e.g., HTTPS). In another configuration, the UE 1002 integrity protects and/or encrypts the reception report before sending the reception report to the server 1004.

Figure 11:
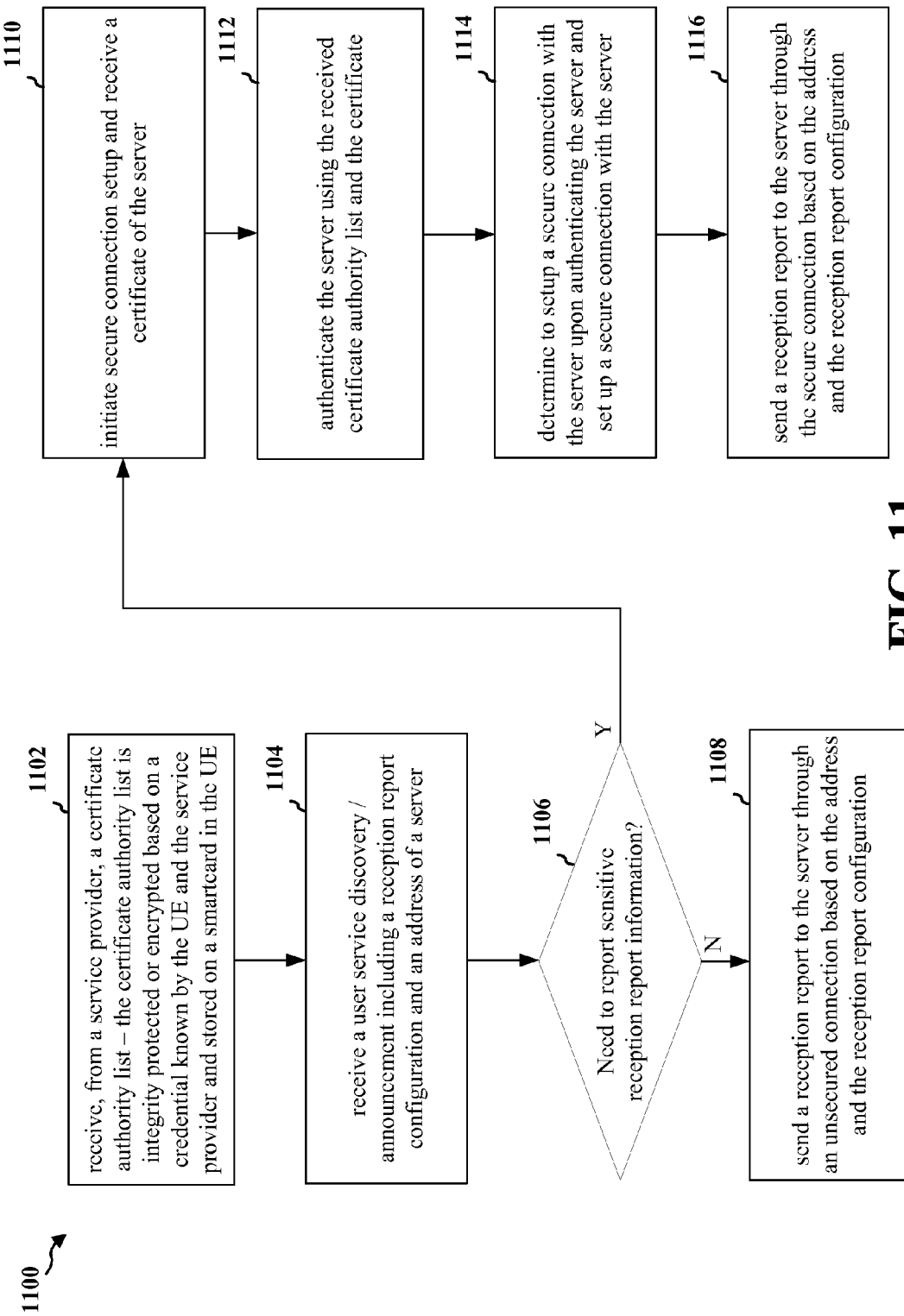
FIG. 11 is a flow chart of a first method of wireless communication.

FIG. 11 is a flow chart 1100 of a first method of wireless communication. The method may be performed by a UE. In step 1102, a UE receives, from a service provider, a certificate authority list. The certificate authority list includes certificates of trusted certificate authorities. The certificate authority list is integrity protected and/or encrypted based on a credential known by the UE and the service provider. The credential may be stored on a smartcard in the UE. The credential may be based on any shared key that is known to the UE and the service provider, such as an MUK or an MRK or a key derived from the MUK or the MRK. In step 1104, the UE receives a user service discovery/announcement including a reception report configuration and an address of a server. The entire user service discovery/announcement or one or more fields within the user service discovery/announcement may be integrity protected and/or encrypted based on a credential known by the UE and the BM-SC. The credential may be stored on a smartcard in the UE. The credential may be a shared key such as an MSK or a key derived from the MSK. After step 1104, if the UE identifies a complete reception of a content item or the completion of a session and determines that a reception report is required, in step 1106, the UE determines whether the reception report includes sensitive reception report information. The determination in step 1106 may be based on the reporting type RAck, StaR, StaR-all, or StaR-only for the reception report or based on other information. If the reception report does not include sensitive information, in step 1108, the UE sends the reception report to the server through an unsecured connection based on the received server address and the reception report configuration. If the reception report includes sensitive information, in step 1110, the UE initiates a secure connection setup (e.g., HTTPS) and receives a certificate of the server. In step 1112, the UE authenticates the server using the received certificate authority list and the certificate. The UE may authenticate the server by verifying the certificate belongs to the same server address as the received server URL and by comparing the certificate to the certificate authority list to verify that the received certificate was issued based on the root certificate in the received certificate authority list. In step 1114, the UE determines to setup a secure connection with the server upon authenticating the server and sets up the secure connection with the server. In step 1116, the UE sends the reception report to the server through the secure connection based on the received server address and the reception report configuration.

Figure 12:
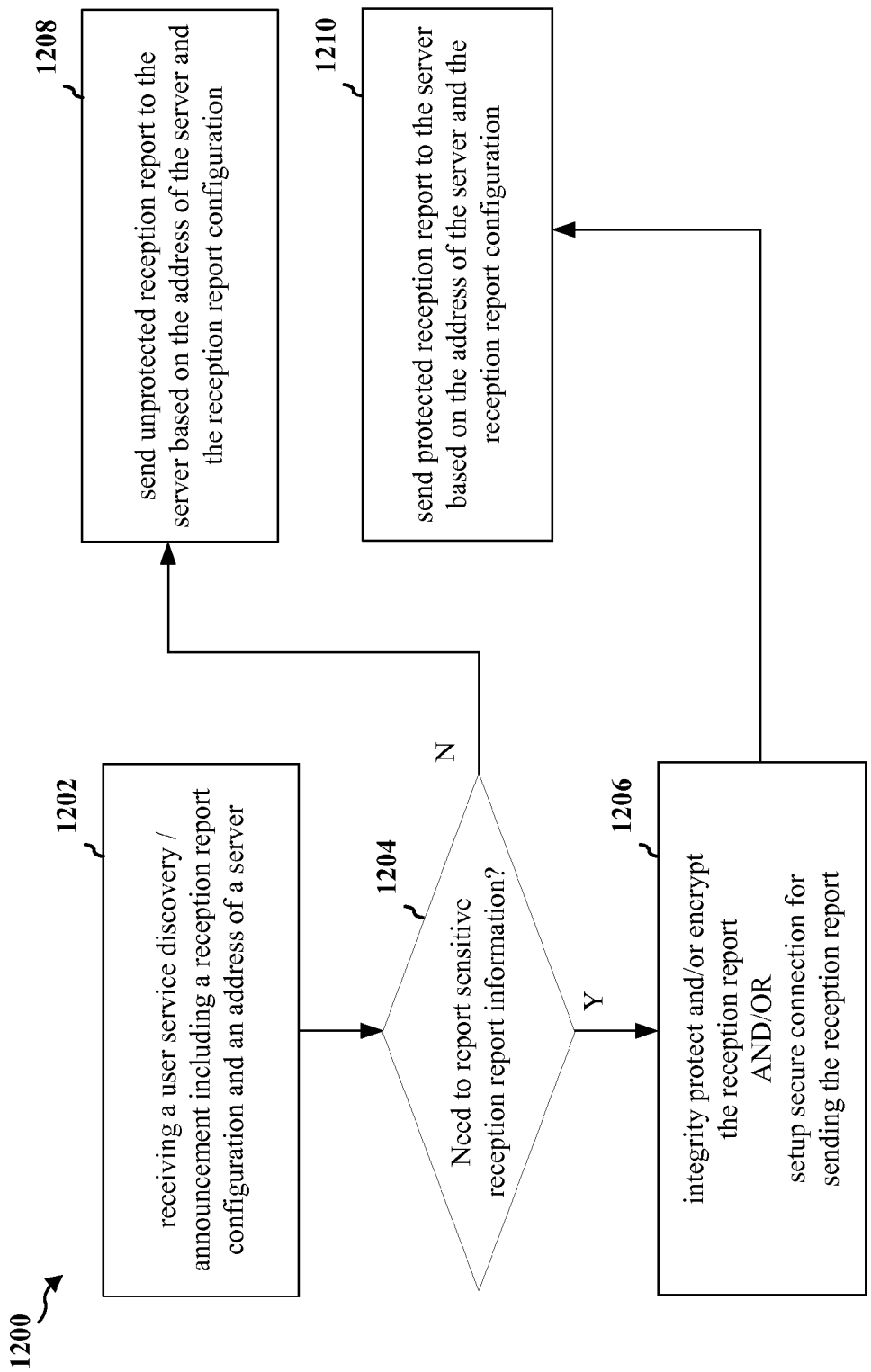
FIG. 12 is a flow chart of a second method of wireless communication.

FIG. 12 is a flow chart 1200 of a second method of wireless communication. The method may be performed by a UE. In step 1202, a UE receives a user service discovery/announcement including a reception report configuration and an address of a server. The entire user service discovery/announcement or portions of the user service discovery/announcement may be integrity protected and/or encrypted. After step 1202, if the UE identifies a complete reception of a content item or the completion of a session and determines that a reception report is required, in step 1204, the UE determines whether the reception report includes sensitive reception report information. The determination in step 1204 may be based on the reporting type RAck, StaR, StaR-all, or StaR-only for the reception report or based on other information. If the reception report does not include sensitive information, in step 1208, the UE sends an unprotected reception report to the server based on the received server address and the reception report configuration. If the reception report includes sensitive information, in step 1206, the UE protects the reception report by integrity protecting and/or encrypting the reception report, and/or setting up a secure connection for sending the reception report. In step 1210, the UE sends a protected reception report to the server based on the reception report configuration.

Figure 13:
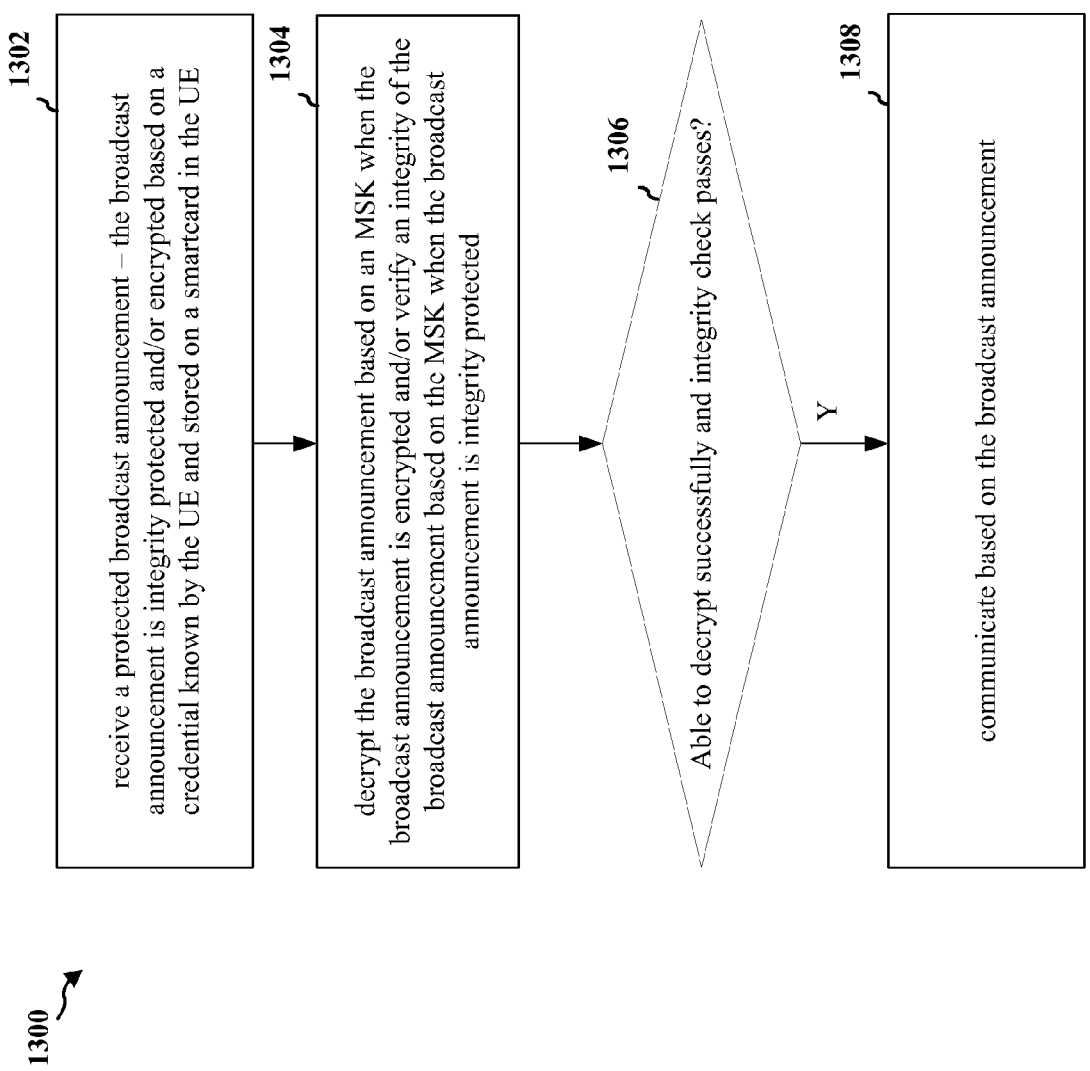
FIG. 13 is a flow chart of a third method of wireless communication.

FIG. 13 is a flow chart 1300 of a third method of wireless communication. The method may be performed by a UE. In step 1302, a UE receives a protected broadcast announcement. The broadcast announcement is integrity protected and/or encrypted. The broadcast announcement may be integrity protected and/or encrypted based on a credential known to the UE and the BM-SC. The credential may be stored on a smartcard in the UE. When the broadcast announcement is integrity protected, the credential may include a checksum or a hash sum. The credential may be stored on a smartcard in the UE. The credential may be a shared key, such as an MSK or a key derived from the MSK. In step 1304, the UE decrypts the broadcast announcement based on the credential/shared key/MSK when the broadcast announcement is encrypted and/or verifies an integrity of the broadcast announcement based on the credential/shared key/MSK when the broadcast announcement is integrity protected. The UE verifies an integrity of the broadcast announcement by recomputing the checksum/hash sum and comparing the recomputed checksum/hash sum with the checksum/hash sum provided in the credential. When the recomputed checksum/hash sum matches the checksum/hash sum in the credential, the integrity check passes. Otherwise, the integrity check fails. In step 1306, the UE determines whether the broadcast announcement was decrypted successfully and/or the integrity check passed. If the UE was able to decrypt the broadcast announcement and/or verify the integrity of the broadcast announcement, in step 1308, the UE may communicate (e.g., send the reception report) based on the broadcast announcement.

Figure 14:
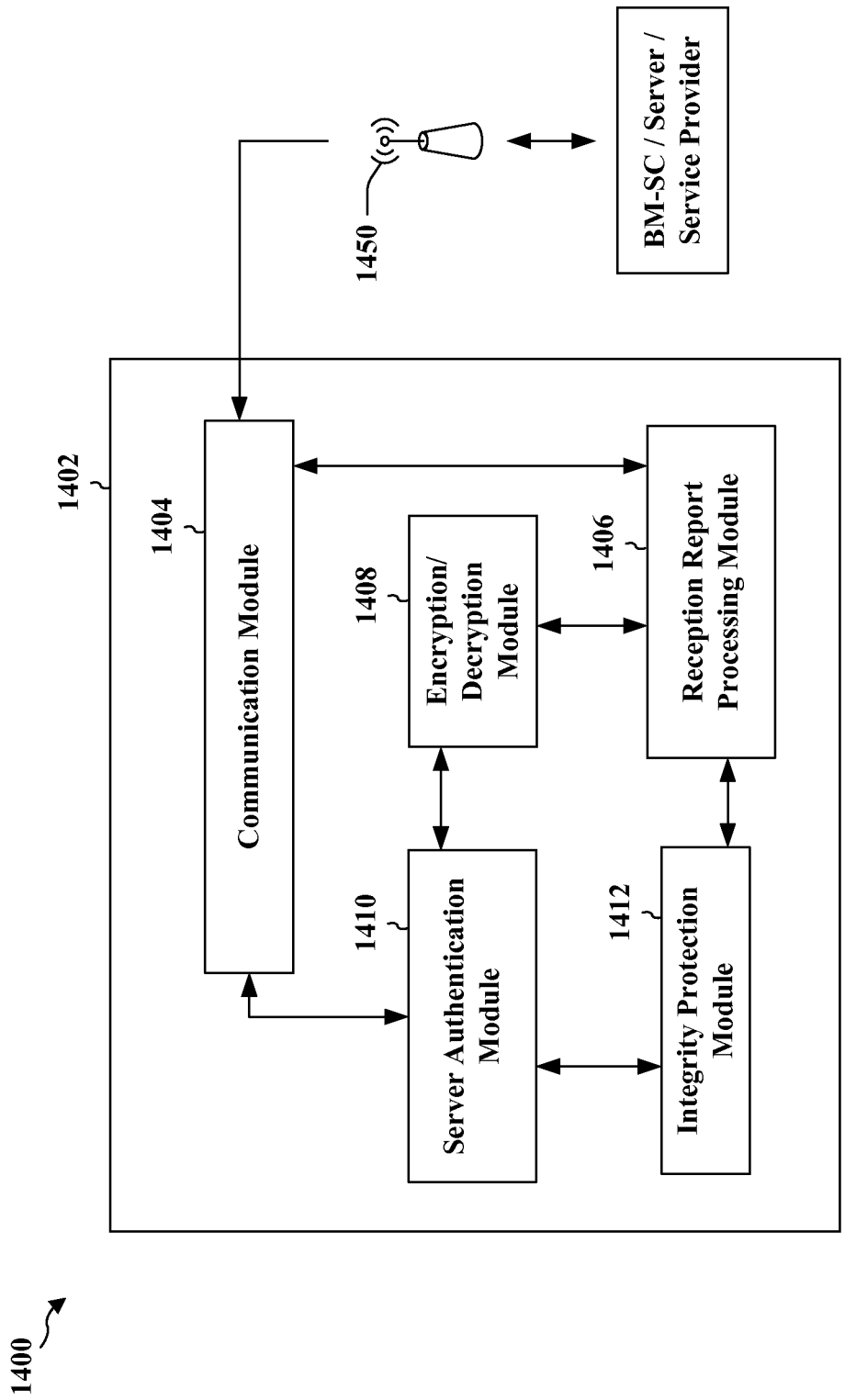
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a communication module 1404 that may be configured to receive, from a service provider via the eNB 1450, a certificate authority list. The certificate authority list may include certificates of trusted certificate authorities. The certificate authority list may be integrity protected and/or encrypted based on a credential known by the UE and the service provider. The credential may be stored on a smartcard in the UE. The credential may be a shared key. The shared key may be any shared key that is known to the UE and the service provider such as an MUK or an MRK or a key derived from the MUK or the MRK. The communication module 1404 may be configured to provide the certificate authority list to a server authentication module 1410. The server authentication module 1410 may be configured to decrypt the certificate authority list through the encryption/decryption module 1408 and may be configured to verify the integrity of the certificate authority list through the integrity protection module 1412. The encryption/decryption module 1408 may be configured to decrypt the certificate authority list based on a credential known to the UE and the server, such as a shared key (e.g., the MUK/MRK or a key derived from the MUK/MRK). The credential may be stored on a smartcard in the UE. The integrity protection module 1412 may be configured to verify the integrity of the certificate authority list based on a credential known to the UE and the server, such as a shared key (e.g., the MUK/MRK or a key derived from the MUK/MRK). The credential may be stored on a smartcard in the UE.

The communication module 1404 may be configured to receive a user service discovery/announcement including a reception report configuration and an address of a server. The user service discovery/announcement may be integrity protected and/or encrypted based on a credential known by the UE and the BM-SC. The credential may be stored on a smartcard in the UE. The credential may be a shared key. The shared key may be an MSK or a key derived from the MSK. The communication module 1404 may be configured to provide the received user service discovery/announcement to a reception report processing module 1406. The reception report processing module 1406 may be configured to decrypt the user service discovery/announcement through the encryption/decryption module 1408 and may be configured to verify the integrity of the user service discovery/announcement through the integrity protection module 1412. The encryption/decryption module 1408 may be configured to decrypt the user service discovery/announcement based on a credential known to the UE and the BM-SC, such as a shared key (e.g., the MSK or a key derived from the MSK). The credential may be stored on a smartcard in the UE. The integrity protection module 1412 may be configured to verify the integrity of the user service discovery/announcement based on a credential known to the UE and the BM-SC, such as a shared key (e.g., the MSK or a key derived from the MSK). The credential may be stored on a smartcard in the UE.

The communication module 1404 may be configured to receive a certificate of the server upon initiating a secure connection with the server. The communication module 1404 may be configured to provide the certificate to the server authentication module 1410. The server authentication module 1410 may be configured to authenticate the server using the received certificate authority list and the received certificate. The server authentication module 1410 may be configured to determine to setup a secure connection (e.g., HTTPS) with the server upon authenticating the server. The server authentication module 1410 may be configured to communicate with the communication module 1404 so that the communication module 1404 sets up a secure connection with the server. The communication module 1404 may communicate to the reception report processing module 1406 when there is a complete reception of a content item or the completion of a session. The reception report process module 1406 may determine whether a reception report is required, and if a reception report is required, generate a reception report. The reception report processing module 1406 may be configured to encrypt the reception report through the encryption/decryption module 1408. The encryption/decryption module 1408 may be configured to encrypt the reception report based on a credential known to the UE and the server, such as a shared key (e.g., the MUK/MRK or a key derived from the MUK/MRK). The credential may be stored on a smartcard in the UE. The reception report processing module 1406 may be configured to integrity protect the reception report through the integrity protection module 1412. The integrity protection module 1412 may be configured to integrity protect the reception report based on a credential known to the UE and the server, such as a shared key (e.g., the MUK/MRK or a key derived from the MUK/MRK). The credential may be stored on a smartcard in the UE. The reception report processing module 1406 may provide the generated reception report to the communication module 1404, which may be configured to send the reception report to the server. If the communication module 1404 has setup a secure connection with the server, the communication module 1404 may be configured to send the reception report to the server through the secure connection.

The apparatus may include additional modules that perform each of the steps of the algorithm in the aforementioned diagrams of FIGS. 8-10 and the flow charts of FIGS. 11-13. As such, each step in the aforementioned diagrams of FIGS. 8-10 and the flow charts of FIGS. 11-13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
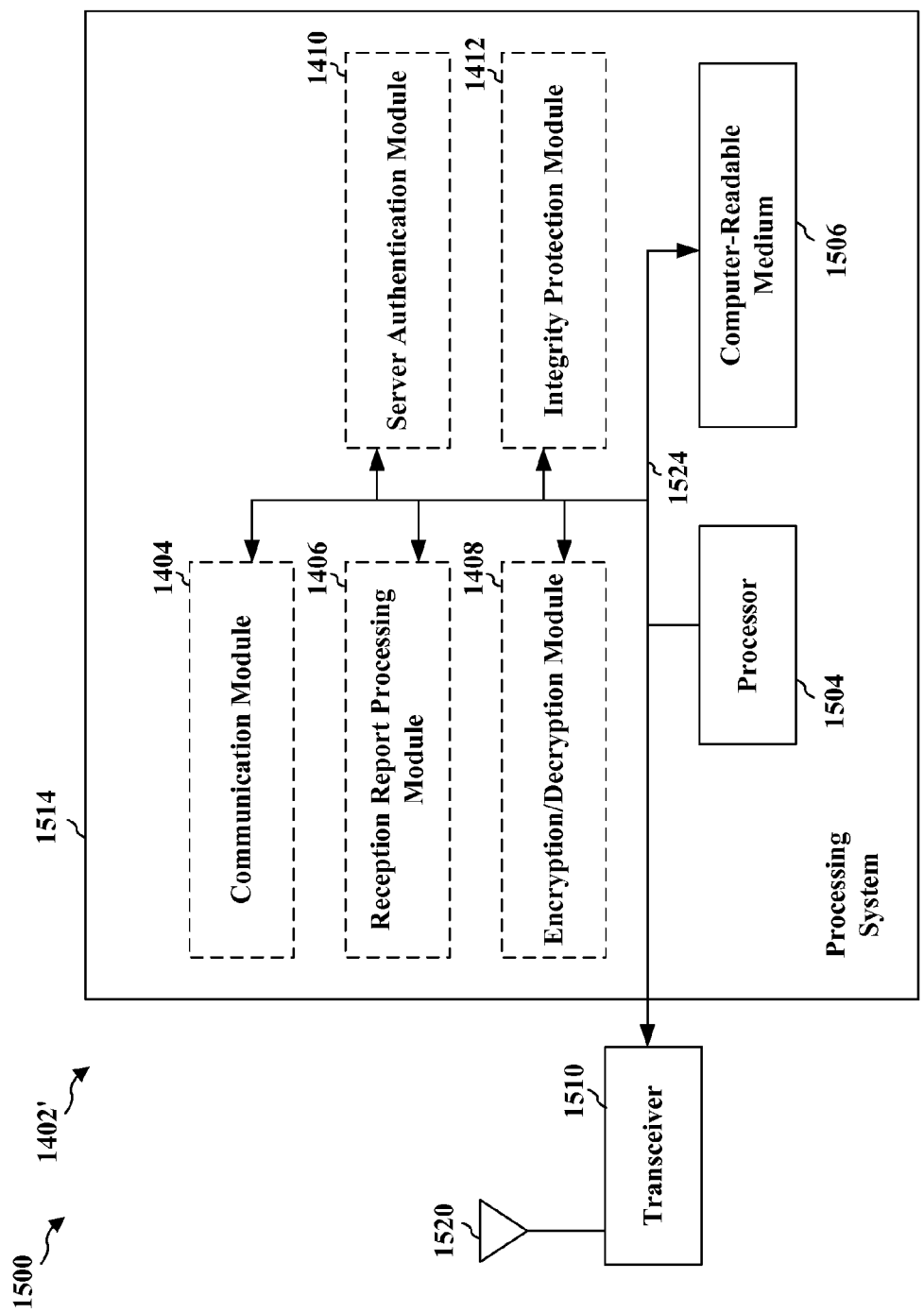
FIG. 15 is a diagram illustrating an example of a hardware implementation for an apparatus employing a processing system.

FIG. 15 is a diagram illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes at least one of the modules 1404, 1406, 1408, 1410, and 1412. The modules may be software modules running in the processor 1504, resident/stored in the computer readable medium 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for receiving, from a service provider, a certificate authority list. The certificate authority list is at least one of integrity protected or encrypted based on a credential known by the apparatus and the service provider. The credential may be stored on a smartcard in the apparatus. The apparatus further includes means for authenticating a server using the received certificate authority list. The apparatus may further include means for receiving a certificate of a server, and means for determining to setup a secure connection with the server upon authenticating the server. The apparatus may further include means for receiving a user service discovery/announcement including a reception report configuration and an address of the server, means for setting up a secure connection with the server, and means for sending a reception report to the server through the secure connection based on the address and the reception report configuration.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In one configuration, the apparatus 1402/1402' for wireless communication includes means for receiving a user service discovery/announcement including a reception report configuration and an address of a server, and means for sending a protected reception report to the server based on the reception report configuration. The apparatus may further include means for setting up a secure connection with the server. The apparatus may further include means for receiving, from a service provider, a certificate authority list, means for receiving a certificate of the server, and means for authenticating the server using the received certificate authority list and the certificate. The apparatus may further include means for integrity protecting and/or encrypting the reception report.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In one configuration, the apparatus 1402/1402' for wireless communication includes means for receiving a protected broadcast announcement. The broadcast announcement is at least one of integrity protected or encrypted based on a credential known by the apparatus and stored on a smartcard in the apparatus. The apparatus further includes means for communicating based on the broadcast announcement. The apparatus may further include means for decrypting the broadcast announcement based on an MSK when the broadcast announcement is encrypted. The apparatus may further include means for verifying an integrity of the broadcast announcement based on an MSK when the broadcast announcement is integrity protected.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C.

Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving a user service discovery/announcement including a reception report configuration and an address of a server;
   determining whether to send a protected reception report in response to receiving the user service discovery/announcement including the reception report configuration and the address of a server;
   setting up a secure connection with the server based on determining to send the protected reception report; and
   sending, through the secure connection, a protected reception report to the server based on one or both of the reception report configuration or the address of the server.

2. The method of claim 1, wherein the secure connection is through Hypertext Transfer Protocol Secure (HTTPS).

3. The method of claim 1, further comprising:
   receiving, from a service provider, a certificate authority list;
   receiving a certificate of the server; and
   authenticating the server using the received certificate authority list and the certificate.

4. The method of claim 3, wherein the certificate authority list is at least one of integrity protected or encrypted based on a credential known by a user equipment (UE) and the service provider.

5. The method of claim 3, wherein the certificate authority list includes certificates of trusted certificate authorities.

6. The method of claim 1, further comprising integrity protecting and/or encrypting the reception report.

7. The method of claim 6, wherein the integrity protecting and/or encrypting is based on a Multimedia Broadcast Multicast Server (MBMS) registration key (MRK).

8. The method of claim 1, wherein the user service discovery/announcement is at least one of integrity protected or encrypted based on a credential known by a user equipment (UE) and a broadcast multicast service center (BM-SC).

9. The method of claim 8, wherein the credential is based on a Multimedia Broadcast Multicast Server (MBMS) service key (MSK).

10. The method of claim 1, wherein determining whether to send the protected reception report is based on a reporting type or a received sample percentage attribute of the reception report configuration.

11. The method of claim 10, wherein the reporting type includes one of a reception acknowledgement, a statistical reporting for successful reception, a statistical reporting for all content reception, or statistical reporting without reception acknowledgement.

12. An apparatus for wireless communication, comprising:
   means for receiving a user service discovery/announcement including a reception report configuration and an address of a server;
   means for determining whether to send a protected reception report in response to receiving the user service discovery/announcement including the reception report configuration and the address of a server;
   means for setting up a secure connection with the server based on determining to send the protected reception report; and
   means for sending, through the secure connection, a protected reception report to the server based on one or both of the reception report configuration or the address of the server.

13. The apparatus of claim 12, wherein the secure connection is through Hypertext Transfer Protocol Secure (HTTPS).

14. The apparatus of claim 12, further comprising:
   means for receiving, from a service provider, a certificate authority list;
   means for receiving a certificate of the server; and
   means for authenticating the server using the received certificate authority list and the certificate.

15. The apparatus of claim 14, wherein the certificate authority list is at least one of integrity protected or encrypted based on a credential known by the apparatus and the service provider.

16. The apparatus of claim 14, wherein the certificate authority list includes certificates of trusted certificate authorities.

17. The apparatus of claim 12, further comprising means for integrity protecting and/or encrypting the reception report.

18. The apparatus of claim 17, wherein the means for integrity protecting and/or encrypting integrity protects and/or encrypts based on a Multimedia Broadcast Multicast Server (MBMS) Request key (MRK) or MBMS User Key (MUK).

19. The apparatus of claim 12, wherein the user service discovery/announcement is at least one of integrity protected or encrypted based on a credential known by the apparatus and a broadcast multicast service center (BM-SC).

20. The apparatus of claim 19, wherein the credential is based on a Multimedia Broadcast Multicast Server (MBMS) service key (MSK).

21. An apparatus for wireless communication, comprising:
   a memory; and
   at least one processor coupled to the memory and configured to:
      receive a user service discovery/announcement including a reception report configuration and an address of a server;
      determine whether to send a protected reception report in response to receiving the user service discovery/announcement including the reception report configuration and the address of a server;
      set up a secure connection with the server based on the determination to send the protected reception report; and
      send, through the secure connection, a protected reception report to the server based on one or both of the reception report configuration or the address of the server.

22. The apparatus of claim 21, wherein the secure connection is through Hypertext Transfer Protocol Secure (HTTPS).

23. The apparatus of claim 21, wherein the at least one processor is further configured to:
 receive, from a service provider, a certificate authority list;
 receive a certificate of the server; and
 authenticate the server using the received certificate authority list and the certificate.

24. The apparatus of claim 23, wherein the certificate authority list is at least one of integrity protected or encrypted based on a credential known by the apparatus and the service provider.

25. The apparatus of claim 23, wherein the certificate authority list includes certificates of trusted certificate authorities.

26. The apparatus of claim 21, wherein the at least one processor is further configured to integrity protect and/or encrypt the reception report.

27. The apparatus of claim 26, wherein the at least one processor integrity protects and/or encrypts based on a Multimedia Broadcast Multicast Server (MBMS) Request key (MRK) MBMS User Key (MUK).

28. The apparatus of claim 21, wherein the user service discovery/announcement is at least one of integrity protected or encrypted based on a credential known by the apparatus and a broadcast multicast service center (BM-SC).

29. The apparatus of claim 28, wherein the credential is based on a Multimedia Broadcast Multicast Server (MBMS) service key (MSK).

30. A non-transitory computer-readable storage medium comprising code that when executed on at least one processor causes the at least one processor to:
 receive a user service discovery/announcement including a reception report configuration and an address of a server;
 determine whether to send a protected reception report in response to receiving the user service discovery/announcement including the reception report configuration and the address of a server;
 set up a secure connection with the server based on the determination to send the protected reception report; and
 send, through the secure connection, a protected reception report to the server based on one or both of the reception report configuration or the address of the server.

* * * * *